United States Patent [19]

Schlegel

[11] 3,731,842
[45] May 8, 1973

[54] SEED SELECTOR FOR PLANTER
[75] Inventor: James E. Schlegel, Western Springs, Ill.
[73] Assignee: International Harvester Company, Chicago, Ill.
[22] Filed: Apr. 29, 1971
[21] Appl. No.: 138,513

[52] U.S. Cl. ............................................... 221/278
[51] Int. Cl. .............................................. B65g 29/00
[58] Field of Search ................... 221/278, 160, 211, 221/187; 222/167, 464, 368, 369, 342, 169, 173

[56] References Cited

UNITED STATES PATENTS

| | | | |
|---|---|---|---|
| 2,960,258 | 11/1960 | Dodwell | 221/211 |
| 3,142,274 | 7/1964 | Winter | 221/278 X |
| 3,542,242 | 11/1970 | Irvine | 221/211 |
| 3,637,108 | 1/1972 | Loesch et al. | 221/211 |
| 2,932,377 | 4/1960 | Ashby | 221/169 X |

*Primary Examiner*—Stanley H. Tollberg
*Attorney*—Floyd B. Harman

[57] ABSTRACT

A seed selecting apparatus having rotatable seed selector drum with peripheral openings, an interior seed supply, air supplied under pressure to the interior selector of the drum to hold seed in the openings and carry the seeds upwardly to a discharge area and a discharge manifold designed to receive the seeds and discharge them through exit tubes. Air flow into the discharge manifold assists in dislodging the seed and ejecting it through the exit tubes.

16 Claims, 4 Drawing Figures

Patented May 8, 1973

INVENTOR
JAMES E. SCHLEGEL
BY F. David Ao Buelow ATT'Y.

Patented May 8, 1973
3,731,842
2 Sheets-Sheet 2
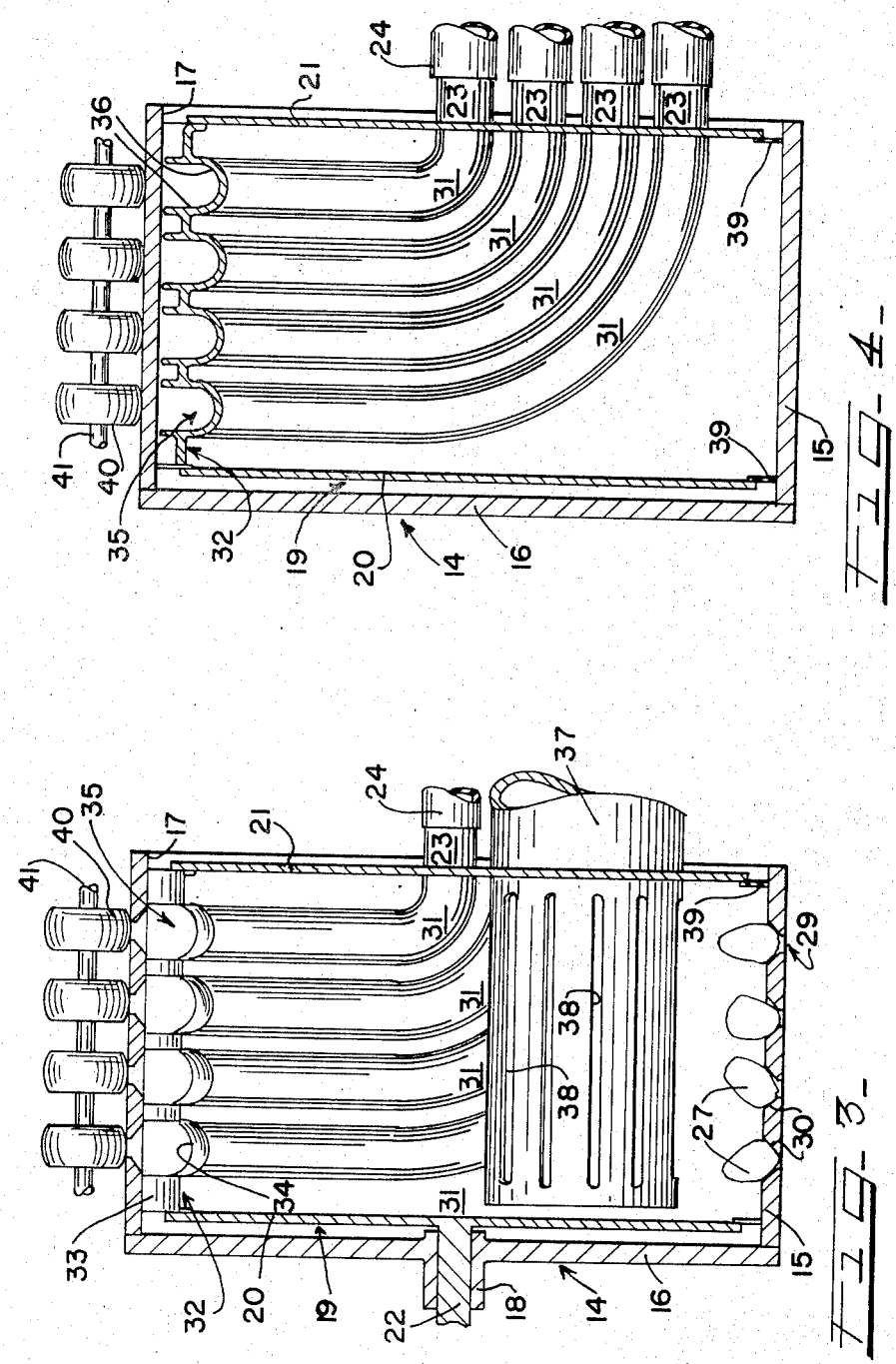
INVENTOR
JAMES E. SCHLEGEL
BY F. David Au Buchen ATT'Y 3,731,842

SEED SELECTOR FOR PLANTER

BACKGROUND OF THE INVENTION

Field of the Invention

This invention relates to dispensers and particularly to dispensers for seed and the like. More specifically, the invention concerns a seed metering device utilizing air pressure differential to select and hold seed and deliver it to a discharge area.

Description of the Invention

Seed planters of the pneumatic type are known. An example of such a planter is disclosed in the Patent to Winter, No. 3,142,274, wherein the seed supply is disposed in a container under atmospheric pressure and vacuum is applied to seed selecting fingers of a pick-up wheel passing through the supply to attract and hold a seed by suction. The seed is carried to a discharge area where it is released by means such as vacuum cut-off or impingement of another air stream on the seed through the pick-up finger to overcome the suction with positive pressure to eject the seed. Another planter of this general type is disclosed in the Patent to Dodwell, No. 2,960,258. Such planters require a great deal of power to maintain the required vacuum and, when the seed is to be positively ejected, requires an additional pressure source. Also, this method of seed selection is unreliable since the seed holding orifice is of a size that chaff or other light debris can be sucked through the orifice and becomes lodged therein thus disturbing the pressure differential. Further, in planters utilizing a vacuum, expensive seals are required throughout the system to maintain the vacuum, since debris is drawn into the system through any leaks.

SUMMARY

The present invention contemplates the provision of novel seed dispensing means utilizing pneumatic principles, wherein a perforated cylindrical selector drum has seed delivered to its lower interior portion and air under pressure is introduced into the interior to hold single seeds in the perforations of the selector drum. The seed bed is kept in a state of agitation by the rotation of the selector drum, facilitating initial seating of the seed in the openings, and the air under pressure holds the seed in its seat during the approach to the exit area. Once the seed has reached the exit area the air flowing through the exit manifold produces sufficient attraction to draw the seeds into the exit air stream.

Pressure differential between the inside and outside of the selector drum attracts and holds seeds in the drum perforations regardless of whether the seed fits the perforation tightly or not. A tight fitting seed is held by the pressure differential and a loose fitting seed is held by the partial vacuum and drag produced by the air escaping around the seed. In each instance, the dislodgement of the seed by gravity and by engagement with the high velocity air stream is assisted by covering the outside of the opening to cut off the escape of air and reduce the pressure differential. Exiting the seed from the drum appears to be very critical, particularly at high rotational drum speeds. The cut-off wheel effectively reduces the seed pocket attraction and does, on occasion, add an acceleration impulse, due to mechanical contact with the seed. However, at high drum speeds, when centripetal force is great, the exit manifold must have sufficient attraction to draw the seed into the exit air stream. The subject invention relates to the configuration of the exit manifold. The proposed exit manifold allows for uniform control of the planter discharge air. Exiting air enters the manifold over its leading edge and flows uniformly through to the exit tubes, thus producing high air velocities over the complete length of the manifold trough. The high air velocity produces a drag on the seed which tends to carry the seed into the air stream. Also, a partial vacuum is formed which tends to dislodge the seed from the seed pocket.

In the exit manifold of the prior art, such as that disclosed in the above referred to Loesch application, the clearance between the sides and trailing edge of the manifold and the selector drum is critical. If this clearance is excessive, air turbulence is created within the exit manifold which decreases the effective length and seed attracting ability of the manifold trough. Likewise, operating variations in drum clearance will produce erratic seed spacing particularly at high drum speeds.

The subject invention minimizes the problems associated with clearance between the exit manifold and the drum because the air flow pattern is not significantly dependent on drum clearance.

DESCRIPTION OF THE DRAWINGS

FIG. 3 is a section taken approximately on the line 3—3 of FIG. 2; and

FIG. 4 is a section taken approximately on the line 4—4 of FIG. 2.

DESCRIPTION OF THE PREFERRED EMBODIMENT

Figure 1:
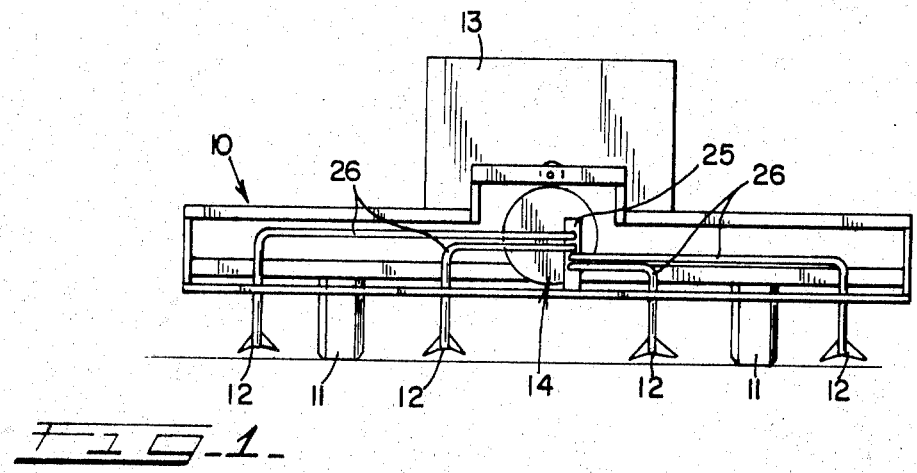
FIG. 1 is a diagrammatic rear elevation of a four-row planter having seed dispensing means incorporating the features of this invention and showing the location of the seed selector.

The planter shown diagrammatically in FIG. 1 is adapted for connection to a tractor, not shown, and comprises a generally rectangular frame 10 supported by two or more wheels 11 and having mounted thereon furrow openers 12 and a seed hopper 13.

A cylindrical seed selector and dispenser assembly generally designated by the numeral 14 is mounted on the planter frame and comprises a peripheral shell portion 15 closed at one end by a side wall 16, and defining at its other end an opening 17. To side wall 16 is affixed a hollow shaft 18 driven by any suitable means, not shown, preferably from the ground wheels 11 of the planter to revolve the selector cylinder in the direction of the arrow in FIG. 2.

An air chamber member generally designated by the numeral 19 is stationarily mounted in selector 14 and comprises a pair of spaced walls or partitions 20 and 21, wall 20 being secured to a fixed shaft 22 mounted in hollow shaft 18 and carried by the planter frame. The opposite wall 21 is seated in opening 17 and is supported in part by vertically spaced outwardly projecting seed discharge tubes 23, the outer ends of which are connected to fittings 24 mounted on a bracket 25 carried by the planter frame for connection to guide tubes 26 through which seed is conducted to the furrow openers 12 and thence to the ground. It should be understood that, while fixed shaft 22 is shown attached only to partition 20, it may, if desired, be extended therethrough for attachment also to partition 21.

Figure 2:
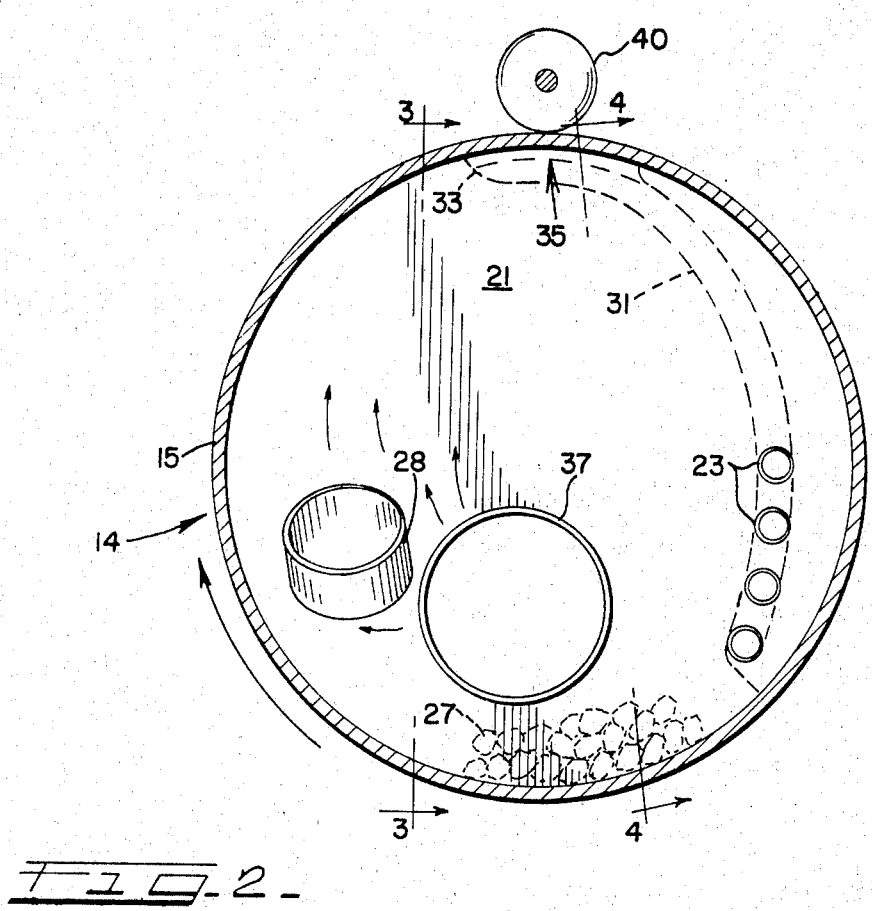
FIG. 2 is an enlarged diagrammatic side elevation of the rotary seed selector shown in FIG. 1.

Seeds 27 are fed to the lower portion of selector 14 from hopper 13 and directed between stationary partitions 20 and 21 of chamber member 19 through a tube 28, mounted in wall 21 and shown in FIG. 2, to form a supply of seed adapted to be received in axially separated rows of circumferentially spaced openings 29 formed in the periphery 15, the inner peripheral portions of the openings, as indicated in FIG. 3, being beveled as at 30 to seat individual seeds 27.

The inwardly extending portions of tubes 23 are bent to form spaced tube portions 31 aligned axially with the selector cylinder and curved upwardly in the manner indicated in FIG. 2. An arcuate portion of the upper ends of tube portions 31, as indicated in FIG. 2, is concentric with the inner periphery of the selector cylinder, and these arcuate portions of the tubes are integrally formed with a sealing member 32. Sealing member 32 interconnects the concentric portions of tube portions 31 and is affixed to the walls or partitions 20 and 21, as indicated in FIGS. 3 and 4.

Sealing member 32 terminates in a thickened and beveled leading edge 33 in sealing engagement with the inner periphery of the selected cylinder and has seed receiving inlets 34 therein communicating with the respective tube portions 31 and the outwardly projecting portions 23. Inlets 34 are open at the top, and rearwardly of the leading edge 33 the cross-section of member 32 is blended, forming troughs 35 having radially outwardly extending sides 36, as indicated in FIG. 4, in quasi-sealing engagement with the inner periphery of the selector cylinder 14, and adapted to register with the respective circumferentially spaced rows of seed cells or openings 29 in the periphery 15 during rotation of the selector cylinder.

Air pressure outside of selector cylinder 14 is atmospheric, and in order for the openings 29 in the periphery 15 to receive and hold a seed 27, air under pressure is introduced into the selector between partitions 20 and 21 from a suitable pump, not shown, on the planter frame, through a pipe 37 mounted in wall 21 of the chamber member 19. As shown in FIG. 3, pipe 37 projects inwardly to a location adjacent to partition 20 and is provided with circumferentially spaced slotted outlets 38 directing streams of air radially outwardly between the partitions 20 and 21, and causing a seed from the supply to seat in each of the openings 29 in the lower part of the selector cylinder, where the seed is held by the pressure differential between the ambient air outside the selector and the compressed air in its interior during rotation of the selector cylinder.

From the seed pick-up area in the lower portion of the selector cylinder the seed is carried in the direction of rotation indicated by the arrow in FIG. 2 and is held in the openings 29 until the discharge area at the top is reached. During the passage of seed to the upper discharge area, excess seed is blown away from the openings by the force of the air discharged from pipe 37, or falls due to gravity and returns to the supply at the bottom. Air discharged in all directions from outlets 38 in pipe 37 also follows the direction of rotation of the selector cylinder, as indicated by arrows in FIG. 3, engaging the beveled leading edge 33 of sealing member 32, and is accelerated through inlets 34 into the troughs 35.

Annular flexible seals 39 affixed to partitions 20 and 21 extend to the inner periphery of the selector cylinder 14 and confine the pressurized air to the area between the partitions. Since the air stream engaging the beveled leading edge 33 of member 32 cannot flow between the individual tubes or between the tubes and the inner periphery of the selector cylinder, as would be the case if the tube portions 31 in the area of sealing member 32 and troughs 35 were free standing, substantially all of the air stream is directed to the inlets 34 and into troughs 35.

Any of the seeds in openings 29 that completely fill the beveled portion 30 are held there by the pressure differential between the exterior and the interior of the selector drum between partitions 20 and 21, while a seed that does not fill the opening is held there in part by suction generated by air under pressure from the interior escaping around the seed. As the seed in openings 29 successively pass over troughs 35, gravity and high velocity air streams entering troughs 35 through inlets 34 overcome the pressure differential and unseat the seed, ejecting it through the tube portions 31 and 23 to the exterior of the selector cylinder and through guide tubes 26 to the furrows formed by the furrow openers 12.

In order to facilitate the dislodging of the seed from openings or cells 29 a series of rollers 40 are provided, one for each circumferential row of openings, and rotatably mounted on a common shaft 41 carried by the planter. Rollers 40 are preferably tires with soft rubber or the like to engage the outer periphery of shell portion 15 of the selector cylinder and serve to successively close the openings to reduce the pressure differential holding the closely seated seeds, and to cut off the escape of air around the less closely fitting seeds.

From the foregoing it should be clear that the provision of a stationary pressurized air chamber in the interior of a rotatable seed selector drum or cylinder and a bank of interconnected seed discharge tubes in sealing engagement with the inner periphery of the selector cylinder, efficiently utilizes the flow of high velocity air to dislodge and eject the seed without waste of air pressure whereby considerably lower air pressure is required than in conventional planters of the pneumatic type.

What is claimed is:

1. In a dispenser for seed and the like, a rotatable seed selector having an interior seed supply, said selector having circumferentially spaced peripheral openings and a seed discharge area in its upper portion, a pressurized chamber member stationarily mounted in said selector, means for delivering air under pressure to the interior of said chamber member to seat seed in said peripheral openings and carry it upwardly to said discharge area, a seed receiving tube mounted in said chamber member having an inlet in said discharge area to receive seed released from said openings and an outlet portion extending exteriorly of said selector to discharge the seed therefrom, and sealing means extending from opposite sides of said inlet and in sealing engagement with the inner periphery of the seed selector.

2. The invention set forth in claim 1, wherein said pressurized chamber member comprises spaced partitions and said sealing means is a sealing member extending between and affixed to said partitions, said sealing member having a leading edge in which said inlet is formed.

3. The invention set forth in claim 2, wherein flexible sealing means carried by said partitions extend radially outwardly therefrom into sealing engagement with the inner periphery of said selector to confine the air under pressure to the area between said partitions.

4. The invention set forth in claim 3, wherein air under pressure supplied to said chamber flows upwardly to said seed discharge area and is directed to said inlets to engage and accelerate the seed through said tube.

5. The invention set forth in claim 4, wherein said sealing means opens upwardly to form an arcuate trough concentric with a portion of the inner periphery of said seed selector.

6. The invention as set forth in claim 5, wherein the seed selector is a cylinder and has a plurality of axially spaced rows of said circumferentially spaced peripheral openings, and a plurality of seed discharge tubes are mounted in said chamber member, the inlet ends of which are interconnected by said sealing member, said inlets being disposed in seed receiving relation to the respective of said rows of peripheral openings.

7. The invention set forth in claim 6, wherein said selector cylinder has an opening in one end and one of said partitions of said chamber member is disposed in said opening to form a closure therefor.

8. The invention set forth in claim 7, wherein said seed selector cylinder is mounted on one end of a rotatable hollow axle and a fixed shaft mounted in said hollow axle is secured to said chamber member.

9. In a dispenser for seed and the like, a rotatable seed selector cylinder having axially spaced rows of circumferentially spaced peripheral openings and a seed supply therein, means for delivering air under pressure to the interior of said seed selector cylinder to collect seed in said openings and carry it upwardly to a discharge area, seed tubes in the seed selector having open seed-receiving ends adjacent the inner periphery of the seed selector in said discharge area to receive seed dislodged from said openings, and sealing means interconnecting the inlet ends of said tubes and disposed in sealing engagement with the inner periphery of said selector cylinder.

10. The invention set forth in claim 9, wherein a portion of said sealing means is concentric with the inner periphery of the selector cylinder and is open at the top to engage the seed selector and form a trough terminating in said inlet.

11. The invention set forth in claim 10, wherein a stationary chamber member is mounted in the selector cylinder and comprises spaced partitions the upper portions of which are connected by said sealing means.

12. The invention set forth in claim 11, wherein the lower portion of said chamber member is open and means are mounted in one of said partitions for delivering seed to the lower portion of the selector cylinder between said partitions.

13. The invention set forth in claim 12, wherein means are provided in said one of said side plates for delivering said air under pressure to the area between said partitions, including means for directing streams of air upwardly in the direction of rotation of the selector cylinder to eject seed released from said openings into said tubes.

14. The invention set forth in claim 13, wherein said sealing means is a sealing member formed integrally with the end portions of said tubes and has a beveled leading edge in sealing engagement with the inner periphery of said selector cylinder.

15. The invention set forth in claim 14, wherein additional sealing means are provided for sealing said stationary chamber member from the selector cylinder to confine the pressurized air to the area between said partitions.

16. The invention set forth in claim 15, wherein said additional sealing means comprises annular flexible members secured to the peripheries of said partitions and extending radially into sealing engagement with the selector cylinder.

* * * * *